United States Patent
Nanri et al.

(10) Patent No.: US 11,069,242 B2
(45) Date of Patent: Jul. 20, 2021

(54) TRAVELING ASSISTANCE METHOD OF TRAVELING ASSISTANCE DEVICE AND TRAVELING ASSISTANCE DEVICE

(71) Applicant: Nissan Motor Co., Ltd., Yokohama (JP)

(72) Inventors: Takuya Nanri, Kanagawa (JP); Fang Fang, Kanagawa (JP); Shoichi Takei, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/615,590

(22) PCT Filed: May 24, 2017

(86) PCT No.: PCT/JP2017/019312
§ 371 (c)(1),
(2) Date: Nov. 21, 2019

(87) PCT Pub. No.: WO2018/216125
PCT Pub. Date: Nov. 29, 2018

(65) Prior Publication Data
US 2020/0111366 A1 Apr. 9, 2020

(51) Int. Cl.
*G08G 1/16* (2006.01)
*B60W 10/04* (2006.01)
*B60W 10/20* (2006.01)
*B60W 30/095* (2012.01)

(52) U.S. Cl.
CPC ............. *G08G 1/166* (2013.01); *B60W 10/04* (2013.01); *B60W 10/20* (2013.01); *B60W 30/0956* (2013.01); *B60W 2554/80* (2020.02)

(58) Field of Classification Search
None
See application file for complete search history.

(56) References Cited

U.S. PATENT DOCUMENTS

| | | | |
|---|---|---|---|
| 2010/0042282 A1 | 2/2010 | Taguchi et al. | |
| 2011/0313665 A1* | 12/2011 | Lueke | G01S 13/931 701/301 |
| 2016/0185348 A1 | 6/2016 | Miura et al. | |
| 2017/0043784 A1 | 2/2017 | Takami | |
| 2017/0113665 A1* | 4/2017 | Mudalige | G08G 1/166 |
| 2017/0113683 A1* | 4/2017 | Mudalige | B60W 30/18145 |
| 2020/0035102 A1* | 1/2020 | Satomura | G08G 1/166 |
| 2020/0255033 A1* | 8/2020 | Matsunaga | G08G 1/166 |

FOREIGN PATENT DOCUMENTS

| | | |
|---|---|---|
| CN | 101542553 A | 9/2009 |
| CN | 105741609 A | 7/2016 |
| JP | 2008-129804 A | 6/2008 |
| JP | 2016-126400 A | 7/2016 |
| WO | 2015/186648 A1 | 12/2015 |
| WO | 2016/104198 A1 | 6/2016 |

* cited by examiner

*Primary Examiner* — Abdhesh K Jha
(74) *Attorney, Agent, or Firm* — Young Basile Hanlon & MacFarlane, P.C.

(57) ABSTRACT

A traveling assistance method acquires driving characteristics of another vehicle around a host vehicle, determines whether the other vehicle is in an autonomous driving mode depending on the driving characteristics of the other vehicle, and detects an action of the other vehicle in accordance with the determination result of whether the other vehicle is in the autonomous driving mode.

9 Claims, 8 Drawing Sheets

[OTHER VEHICLE]

[HOST VEHICLE]

[OTHER VEHICLE]

[HOST VEHICLE]

FIG. 7B

[OTHER VEHICLE]

[HOST VEHICLE]

[OTHER VEHICLE]

[HOST VEHICLE]

TRAVELING ASSISTANCE METHOD OF TRAVELING ASSISTANCE DEVICE AND TRAVELING ASSISTANCE DEVICE

TECHNICAL FIELD

The present invention relates to a traveling assistance method and a traveling assistance device for detecting an action of another vehicle around a host vehicle and executing traveling assistance to the host vehicle based on the detected action of the other vehicle.

BACKGROUND

A vehicle control device is known that controls a vehicle depending on the corresponding conditions when the vehicle is traveling under the presence of a blind spot (WO 2016/104198). The vehicle control device disclosed in WO 2016/104198 determines the relative priority between a route that the host vehicle is following and a route that another vehicle is following, so as to predict the action of the other vehicle in accordance with the determined priority.

The vehicle control device disclosed in WO 2016/104198 still has a problem of accurately detecting the action of the other vehicle in a traveling situation in which the host vehicle should yield the way to the other vehicle in view of the timing, even though the host vehicle has higher priority on the road over the other vehicle.

SUMMARY

To solve the conventional problem described above, the present invention provides a traveling assistance method and a traveling assistance device capable of improving the accuracy of detecting an action of another vehicle.

A traveling assistance method according to an aspect of the present invention acquires driving characteristics of another vehicle around a host vehicle, determines whether the other vehicle is in an autonomous driving mode depending on the driving characteristics of the other vehicle, sets an intersecting area in which a traveling region of the host vehicle and a traveling region of the other vehicle intersect with each other, and detects an action of the other vehicle which enters the intersecting area in accordance with the determination result of whether the other vehicle is in the autonomous driving mode.

The aspect of the present invention can improve the accuracy of detecting the action of the other vehicle.

DETAILED DESCRIPTION

Hereinafter, an embodiment will be described in detail with reference to the drawings.

Figure 4:
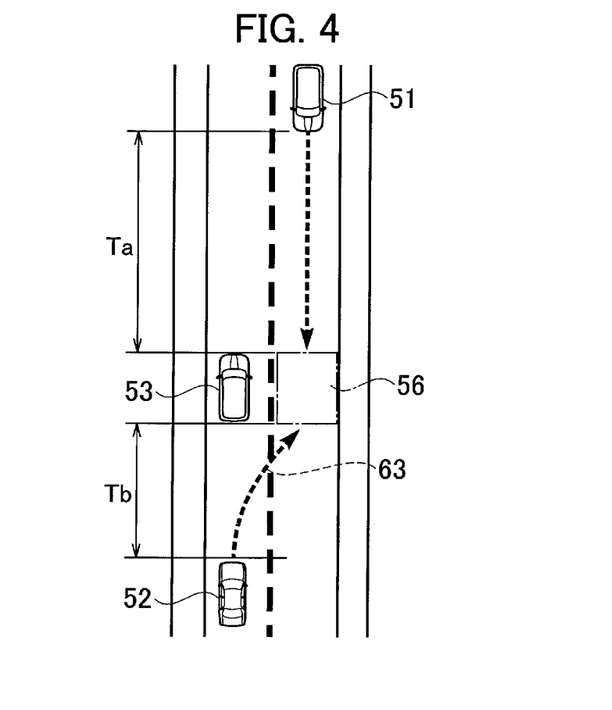
FIG. 4 is a zenith view illustrating a traveling situation in which a host vehicle 51 is traveling in its traveling lane on a two-lane oncoming road, and another vehicle 52 is traveling ahead of the host vehicle 51 in the oncoming lane.

A traveling assistance device according to the embodiment is effective for use in a traveling situation as shown in FIG. 4, for example. FIG. 4 illustrates a case in which a host vehicle 51 is traveling in its traveling lane on a two-lane oncoming road, and another vehicle 52 is traveling ahead of the host vehicle 51 in the oncoming lane. A parked vehicle 53 is present in the oncoming lane between the host vehicle 51 and the other vehicle 52. The other vehicle 52 is presumed to temporarily change the course toward the right so as to avoid the parked vehicle 53 and keep the traveling direction. Since the host vehicle 51 and the other vehicle 52 cannot simultaneously pass by the parked vehicle 53, either the host vehicle 51 or the other vehicle 52 needs to yield the way to the other to let it pass by first. Namely, since the traveling region of the host vehicle 51 and the traveling region of the other vehicle 52 intersect with each other in an intersecting area 56, the host vehicle 51 and the other vehicle 52 cannot simultaneously enter the intersecting area 56, and either the host vehicle 51 or the other vehicle 52 needs to change the timing of entering the intersecting area 56.

The host vehicle 51 has priority on this road over the other vehicle 52. In addition, a presumed time (reaching time) Ta that the host vehicle 51 needs to reach the intersecting area 56 is longer than a presumed time (reaching time) Tb that the other vehicle 52 needs to reach the intersecting area 56. FIG. 4 illustrates the case in which the other vehicle 52 can go ahead in view of the timing, even though the host vehicle 51 has higher priority on the road over the other vehicle 52. In this traveling situation, a connection is caused between the host vehicle 51 and the other vehicle 52 as to which one of the host vehicle 51 and the other vehicle 52 should enter the intersecting area 56 first.

A value obtained by subtracting the reaching time Tb of the other vehicle 52 from the reaching time Ta of the host vehicle 51 ($\Delta T=Ta-Tb$) is herein referred to as a "reaching time difference".

Figure 7A:
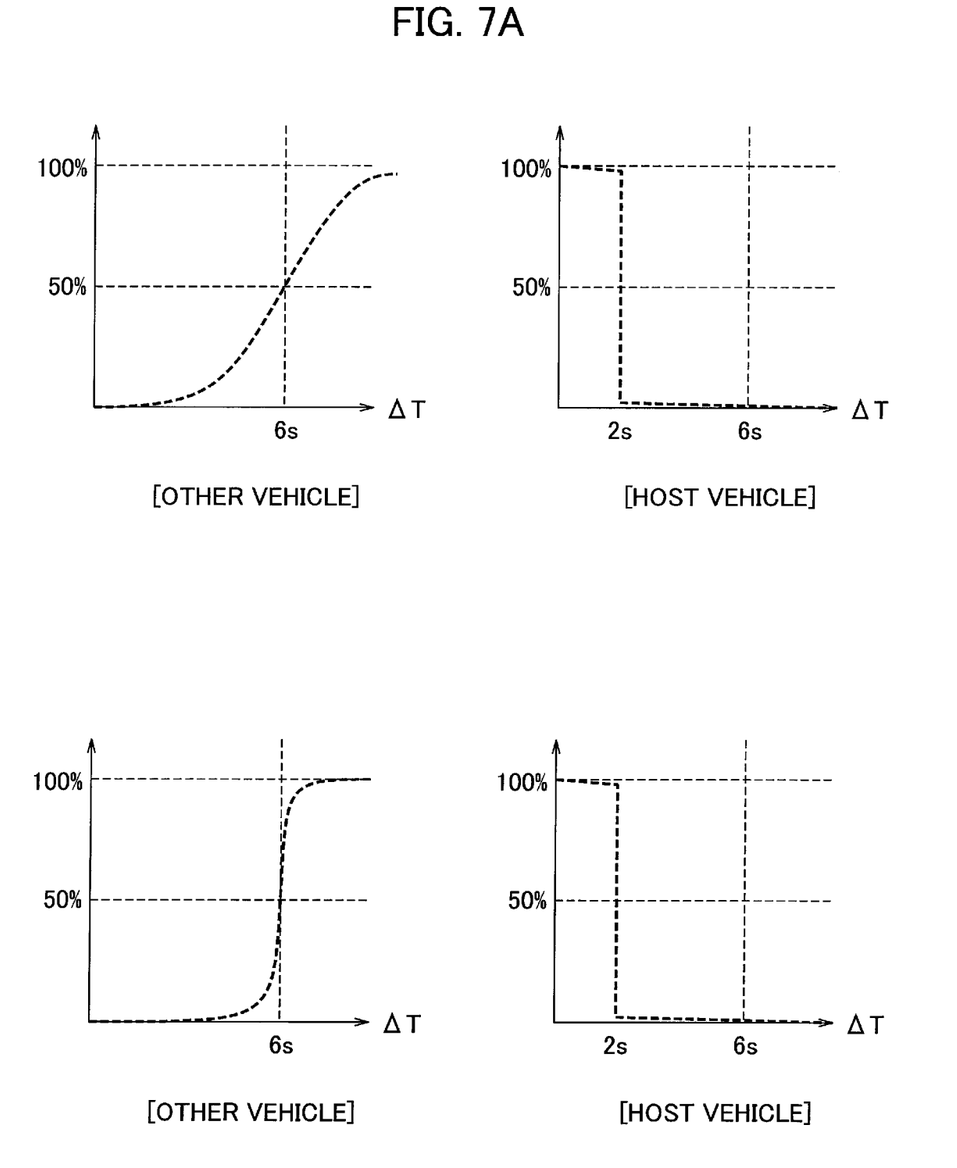
FIG. 7A is a view indicating, in the respective graphs, a probability distribution of an earlier entrance to an intersecting area 56 with respect to a difference in reaching time ΔT, the graphs on the upper left side and the lower left side corresponding to a case in which the other vehicle 52 enters first in a manual driving mode and in an autonomous driving mode, the graphs on the upper right side and the lower right side corresponding to a case in which the host vehicle 51 enters first when not recognizing whether the other vehicle 52 is in the autonomous driving mode.
Figure 7B:
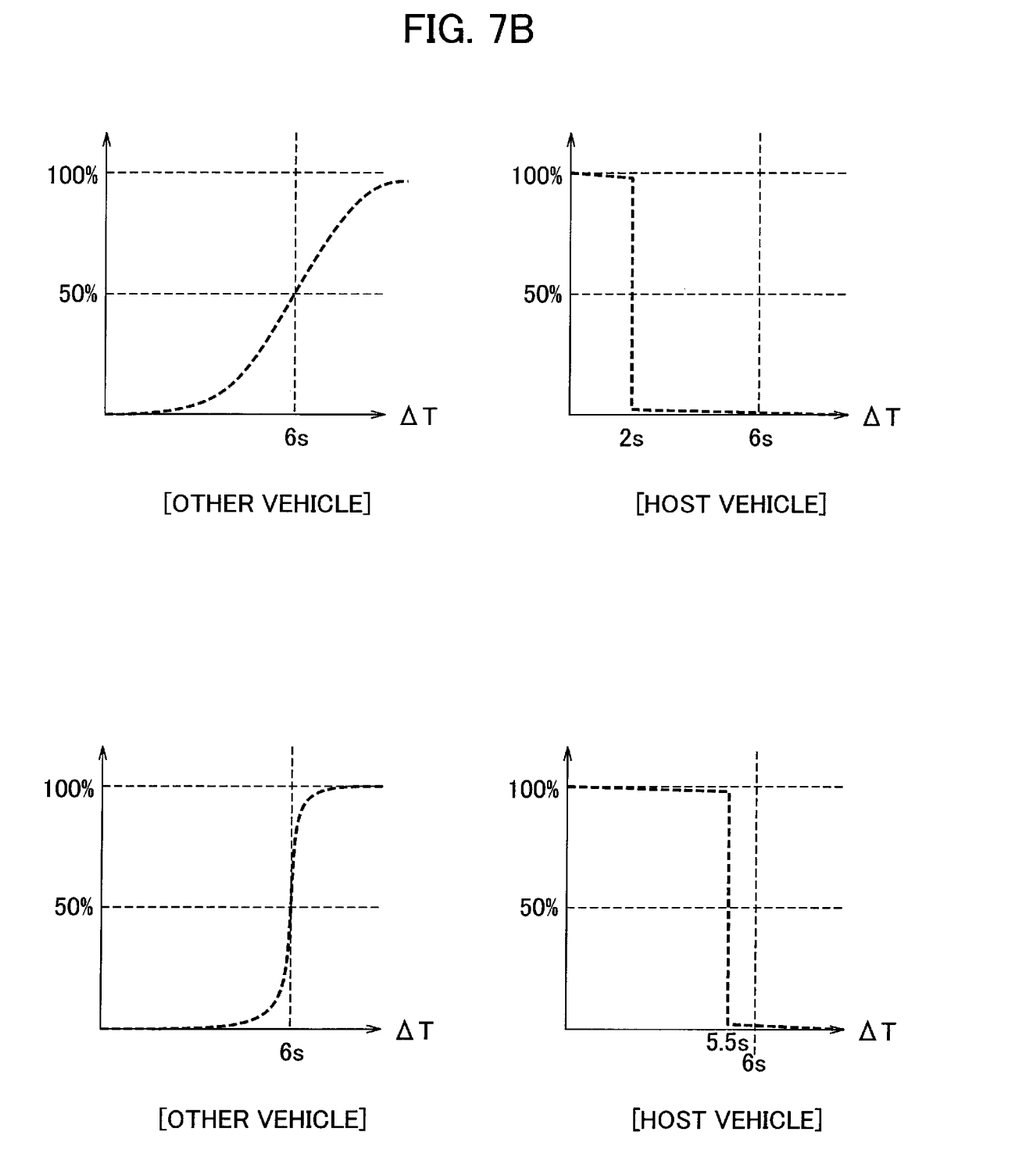
FIG. 7B is a view indicating, in the respective graphs, the probability distribution of the earlier entrance to the intersecting area 56 with respect to the reaching time difference ΔT, the graphs on the upper left side and the lower left side corresponding to a case in which the other vehicle 52 enters first in the manual driving mode and in the autonomous driving mode, the graphs on the upper right side and the lower right side corresponding to a case in which the host vehicle 51 enters first when recognizing whether the other vehicle 52 is in the autonomous driving mode.

FIG. 7A and FIG. 7B are graphs each showing a relationship between the reaching time difference $\Delta T$ (the axis of abscissas) and a probability of entering the intersecting area 56 first (the axis of ordinates). The graphs on the upper left side and the lower left side in FIG. 7A and FIG. 7B each show the probability that the other vehicle 52 will enter the intersecting area 56 first. The graphs on the upper right side and the lower right side in FIG. 7A and FIG. 7B each show the probability that the host vehicle 51 will enter the intersecting area 56 first.

The graphs on the upper left side in FIG. 7A and FIG. 7B illustrate the case in which the other vehicle 52 is traveling in a manual driving mode operated by the driver (person). The probability that the other vehicle 52 will enter first is higher as the reaching time difference $\Delta T$ is greater. The other vehicle 52 will enter the intersecting area 56 with the probability of about 50% at a predetermined time (6 seconds, for example).

However, the determination of action by the driver (person) differs among individuals, and a variation in the determination of action with respect to the reaching time difference $\Delta T$ is large. The probability that the other vehicle 52 will enter first barely changes with the change in the reaching time difference $\Delta T$. In other words, the probability that the other vehicle 52 will enter first does not immediately fall to 0% when the reaching time difference $\Delta T$ is slightly shorter than the predetermined time (6 seconds, for example). The probability that the other vehicle 52 will enter first falls to approximately 0% when the reaching time difference $\Delta T$ is about 2 seconds. The host vehicle 51 then needs to estimate a greater safety coefficient with respect to the other vehicle 52 in the traveling situation shown in FIG. 4. In particular, as shown in the respective graphs on the upper right side in FIG. 7A and FIG. 7B, the host vehicle 51 needs to determine whether to enter the intersecting area 56 first around a point at which the probability that the other vehicle 52 will enter first falls to approximately 0% (2 seconds, for example). In other words, the host vehicle 51 can determine to enter the intersecting area 56 first when the reaching time difference $\Delta T$ is less than 2 seconds.

The respective graphs on the lower left side in FIG. 7A and FIG. 7B illustrate the case in which the other vehicle 52 is in an autonomous driving mode capable of autonomous traveling without operation by the driver (person). The autonomous driving mode leads the other vehicle 52 (computer) to determine its own action so as to operate in accordance with the determination result. The variation in the determination of action in the autonomous driving mode is typically smaller than that in the manual driving mode. For example, as shown in the respective graphs on the lower left side in FIG. 7A and FIG. 7B, the probability that the other vehicle 52 will enter the intersecting area 56 first steeply changes from 0% to 100% about a predetermined time (6 seconds, for example). Namely, the host vehicle 51 can accurately determine the probability of entrance of the other vehicle 52 based on the reaching time difference $\Delta T$ when the other vehicle 52 is in the autonomous driving mode.

The host vehicle 51, however, still needs to take safety measures with respect to all possible determinations of action of the other vehicle 52 when the other vehicle 52 is in the autonomous driving mode but the host vehicle 51 is not recognizing it. As shown in the graph on the lower right side in FIG. 7A, the host vehicle 51 should determine whether to enter the intersecting area 56 first around a point (2 seconds, for example) shorter than the predetermined time (6 seconds, for example), as in the case of the manual driving mode. The reaching time difference $\Delta T$ in the range of 2 seconds to 6 seconds when the other vehicle 52 is in the autonomous driving mode, as shown in the graphs on the lower left side and the lower right side in FIG. 7A, may lead to a deadlock in which the host vehicle 51 and the other vehicle 52 keep yielding the way to each other.

The host vehicle 51, when recognizing that the other vehicle 52 is in the autonomous driving mode, can determine whether to enter the intersecting area 56 first about a point (5.5 seconds, for example) closer to the predetermined time (6 seconds, for example), as shown in the graph on the lower right side in FIG. 7B. In particular, the host vehicle 51 can determine to enter the intersecting area 56 first when the reaching time difference $\Delta T$ is less than 5.5 seconds. The recognition by the host vehicle 51 that the other vehicle 52 is in the autonomous driving mode changes the threshold used for the determination of entrance of the host vehicle 51 from 2 seconds to 5.5 seconds. The approximation of the threshold (six seconds) of the other vehicle 52 to the threshold (5.5 seconds) of the host vehicle 51 can avoid a deadlock, as shown in the graphs on the lower left side and the lower right side in FIG. 7B. The change in the threshold upon the determination by the host vehicle 51 from 2 seconds to 5.5 seconds enables the host vehicle 51 to enter first when the reaching time difference $\Delta T$ is in the range from 2 seconds to 5.5 seconds, so as to allow the host vehicle 51 to travel smoothly.

As shown in the graphs on the upper right side and the lower right side in FIG. 7B, the host vehicle 51 can be controlled such that the timing when the host vehicle 51 passes through the intersecting area 56 is set to be earlier in the case in which the other vehicle 52 is in the autonomous driving mode than in the case in which the other vehicle 52 is not in the autonomous driving mode.

The embodiment thus determines whether the other vehicle 52 is in the autonomous driving mode, and detects the action of the other vehicle 52 in accordance with the determination result. The embodiment makes use of the variation in the determination of action of the other vehicle 52 with respect to the reaching time difference $\Delta T$, which changes depending on whether the other vehicle 52 is in the autonomous driving mode. In particular, the embodiment makes use of the fact that the variation upon the autonomous driving is smaller than the variation upon the manual driving mode.

The configuration of the traveling assistance device according to the embodiment is described below with reference to FIG. 1. The traveling assistance device includes an object detection device 1, a host-vehicle position estimation device 3, a map acquisition device 4, and a microcomputer 100.

The object detection device 1 includes various kinds of object detection sensors mounted on the host vehicle 51, such as a laser radar, a millimeter-wave radar, and a camera, for detecting objects around the host vehicle 51. The object detection device 1 detects objects around the host vehicle 51 using these object detection sensors. The object detection device 1 detects moving objects such as other vehicles, motorcycles, bicycles, and pedestrians, and stationary objects such as parked vehicles. For example, the object detection device 1 detects a position, an attitude, a size, a velocity, acceleration, deceleration, and a yaw rate of a moving object or a stationary object on the basis of the host vehicle. As used herein, a position, an attitude (a yaw angle), a size, a velocity, acceleration, deceleration, and a yaw rate of an object are collectively referred to as "behavior" of the object. The object detection device 1 outputs, as detection results, the behavior of a two-dimensional object in the zenithal view (also referred to as a plan view) as viewed from the air above the host vehicle 51, for example.

The host-vehicle position estimation device 3 includes a position detection sensor mounted on the host vehicle, such as a global positioning system (GPS) and a means of odometry, for measuring an absolute position of the host vehicle 51. The host-vehicle position estimation device 3 measures the absolute position of the host vehicle 51, which is the position, the attitude, and the velocity of the host vehicle 51 based on a predetermined reference point, by use of the position detection sensor.

The map acquisition device 4 acquires map information indicating a structure of a road on which the host vehicle 51 is traveling. The map information acquisition device 4 may hold map database storing the map information, or may acquire the map information from an external map data server through cloud computing. The map information acquired by the map acquisition device 4 includes various pieces of information on the road structure, such as absolute positions of lanes, and a connectional relation and a relative positional relation of lanes.

The microcomputer 100 (an example of a controller) detects an action of the other vehicle in accordance with the detection results obtained by the object detection device 1 and the host-vehicle position estimation device 3 and the information acquired by the map acquisition device 4, generates a route of the host vehicle 51 depending on the detected action of the other vehicle, and assists the host vehicle 51 in traveling in accordance with the generated route.

The embodiment exemplifies the microcomputer 100 as the traveling assistance device for controlling the host vehicle 51, but is not limited to this case. For example, the microcomputer 100 may be applicable to the case of functioning as an action detection device for detecting the action of the other vehicle. The microcomputer 100 thus may finally output the detected action of the other vehicle without the route generation and the traveling control along the route generated for the host vehicle 51.

The microcomputer 100 is a general-purpose microcomputer including a central processing unit (CPU), a memory, and an input-output unit. A computer program (a traveling assistance program) is installed on the microcomputer 100 so as to function as the traveling assistance device. The microcomputer 100 functions as a plurality of information processing circuits (2a, 2b, 5, 10, 21, and 22) included in the traveling assistance device when the computer program is executed. While the embodiment is illustrated with the case in which the software is installed to fabricate the information processing circuits (2a, 2b, 5, 10, 21, and 22) included in the traveling assistance device, dedicated hardware for executing each information processing as described below can be prepared to compose the information processing circuits (2a, 2b, 5, 10, 21, and 22). The respective information processing circuits (2a, 2b, 5, 10, 21, and 22) may be composed of individual hardware. The information processing circuits (2a, 2b, 5, 10, 21, and 22) may also serve as an electronic control unit (ECU) used for other control processing with regard to the vehicle.

The microcomputer 100 includes, as the respective information processing circuits (2a, 2b, 5, 10, 21, and 22), a detection integration unit 2a, an object tracking unit 2b, a position-in-map calculation unit 5, an action prediction unit 10, a host-vehicle route generation unit 21, and a vehicle control unit 22. The action prediction unit 10 includes a behavior determination unit 11, an action-probability prediction unit 12, a first action-probability correction unit 13, a second action-probability correction unit 15, a course prediction unit 16, a likelihood ratio estimation unit 17, an intersection determination unit 18, and an autonomous driving determination unit 19. When the microcomputer 100 is used as the action detection device for detecting the action of the other vehicle, the information processing circuits as the host-vehicle route generation unit 21 and the vehicle control unit 22 are not necessarily included.

The detection integration unit 2a integrates several detection results obtained by the respective object detection sensors included in the object detection device 1 to output a single detection result per object. In particular, the detection integration unit 2a calculates the behavior of an object, which is the most reasonable and has the least error among pieces of the behavior of the object detected by the respective object detection sensors, in view of error characteristics of the respective object detection sensors. The detection integration unit 2a collectively evaluates the detection results obtained by the various sensors so as to obtain a more accurate detection result for each object by a conventional sensor fusion method.

The object tracking unit 2b tracks each object detected by the object detection device 1. In particular, the object tracking unit 2b determines the sameness of the object (mapping) detected at intervals in accordance with the behavior of the object output at different times, by use of the detection result integrated by the detection integration unit 2a, and detects the behavior of the object in accordance with the mapping result. Each piece of the behavior of the object output at different times is stored in the memory in the microcomputer 100, and is used for course prediction described below.

The position-in-map calculation unit 5 estimates the position and the attitude of the host vehicle 51 on the map according to the absolute position of the host vehicle 51 acquired by the host-vehicle position estimation device 3 and the map data acquired by the map acquisition device 4. For example, the position-in-map calculation unit 5 specifies the road on which the host vehicle 51 is traveling, and the traveling lane of the host vehicle 51 on the road.

The action prediction unit 10 predicts an action of a moving object around the host vehicle 51 in accordance with the detection result obtained by the detection integration unit 2a and the position of the host vehicle 51 specified by the position-in-map calculation unit 5. The specific configuration of the action prediction unit 10 is described in detail below.

The behavior determination unit 11 specifies the position and the behavior of the object on the map in accordance with the position of the host vehicle 51 on the map and the behavior of the object acquired by the detection integration unit 2a. The behavior determination unit 11 determines that the object is a moving object when the position of the object on the map changes with the passage of time, and determines the attribute of the moving object (a vehicle or a pedestrian, for example) in accordance with the size and the velocity of the moving object. When the moving object is determined to be another traveling vehicle, the behavior determination unit 11 specifies the road on which the other vehicle is traveling and its traveling lane.

When the position of the object on the map does not change with the passage of time, the behavior determination unit 11 determines that the object is a stationary object, and determines the attribute of the stationary object (a parked vehicle or a pedestrian, for example) in accordance with the position, the attitude, and the size of the stationary object on the map.

The action probability prediction unit 12 predicts a probability of action of the other vehicle based on the map. The action probability prediction unit 12 predicts the intention of action that the other vehicle would take next, based on the road structure included in the map information and the information on the lane to which the other vehicle belongs, and calculates a primary course of the other vehicle in accordance with the predicted intention of action based on the road structure. As used herein, the term "probability of action" refers to a superordinate concept including the intention of action and the primary course. The term "primary course" encompasses profiles of positions of the other vehicle at different times and also profiles of velocities of the other vehicle at the respective positions.

For example, when the other vehicle is traveling on a single curved road with a single lane, the action probability prediction unit 12 predicts the intention of action of following the lane (forward movement), and calculates a course along the lane on the map as the primary course. When the other vehicle is traveling on a single curved road with a plurality of lanes, the action probability prediction unit 12 predicts the intention of action of the forward movement and the intention of action of changing the lane to the right or the left (lane change). The primary course of the other vehicle with the intention of action upon the lane change is a course of changing lanes based on the road structure and a predetermined period of lane-change time. When the other vehicle is traveling toward an intersection, the action probability prediction unit 12 predicts the intention of action including a forward movement, a right turn, and a left turn, and calculates a forward-movement course, a right-turn course, and a left-turn course as the primary course based on the road structure at the intersection on the map. The calculation of the "primary course" takes the road structure into consideration, but does not take account of the behavior of the other vehicle integrated by the detection integration unit 2a.

The first action-probability correction unit 13 takes account of a stationary object detected by the object detection device 1 to correct the probability of action predicted by the action probability prediction unit 12. In particular, the first action-probability correction unit 13 determines whether the primary course of the other vehicle and the position of the stationary object overlap with each other. When the primary course and the position overlap with each other, the first action-probability correction unit 13 further adds an intention of action and a primary course of the other vehicle 52 for avoiding the stationary object.

In particular, in the traveling situation shown in FIG. 4, the action probability prediction unit 12 predicts the intention of action (forward movement) of the other vehicle 52 and the primary course (forward movement) for traveling along the traveling lane. The first action-probability correction unit 13 determines that the primary course (forward movement) of the other vehicle 52 overlaps with the position of the parked vehicle 53 as a stationary object. The first action-probability correction unit 13 then further adds the intention of action of the other vehicle 52 (the primary course 63) for temporarily changing the course toward the right so as to avoid the parked vehicle 53 and keep the traveling direction.

When another moving object (not shown) is detected by the object detection device 1 simultaneously with the other vehicle 52 shown in FIG. 4, the first action-probability correction unit 13 takes account of the other moving object to correct the probability of action predicted by the action probability prediction unit 12.

The intersection determination unit 18 determines whether the traveling region of the host vehicle 51 and the traveling region of the other vehicle 52 intersect with each other. When the respective traveling regions intersect with each other, the intersection determination unit 18 calculates the difference in reaching time (reaching time difference $\Delta T$) between the host vehicle 51 and the other vehicle 52 toward the intersecting area 56 at which the traveling region of the host vehicle 51 and the traveling region of the other vehicle 52 intersect with each other.

In particular, the intersection determination unit 18 predicts the time (the reaching time) Tb that the other vehicle 52 needs to reach the intersecting area 56, in accordance with the primary course 63, and the position and the behavior of the other vehicle 52 on the map. The intersection determination unit 18 also predicts the time (the reaching time) Ta that the host vehicle 51 needs to reach the intersecting area 56, in accordance with the position, the velocity, and the acceleration and deceleration of the host vehicle 51 on the map. The intersection determination unit 18 subtracts the reaching time Tb of the other vehicle 52 from the reaching time Ta of the host vehicle 51 to calculate the reaching time difference $\Delta T$.

The autonomous driving determination unit 19 (the controller) acquires driving characteristics of the other vehicle 52, and determines whether the other vehicle 52 is in the autonomous driving mode. In particular, the autonomous driving determination unit 19 determines whether the other vehicle 52 is in the manual driving mode operated by the driver (person) or in the autonomous driving mode capable of autonomously traveling without the driving operation by the driver (person).

The autonomous driving determination unit 19 may determine whether the other vehicle 52 is in the autonomous driving mode only when the intersection determination unit 18 determines that the traveling region of the host vehicle 51 and the traveling region of the other vehicle 52 intersect with each other. This can decrease the number of other vehicles 52 to be targeted by the autonomous driving determination unit 19 to reduce the processing load.

The autonomous driving determination unit 19 uses a communication device of a vehicle-to-vehicle communication device (V2V) as a sensor to acquire the driving characteristics of the other vehicle 52. The autonomous driving determination unit 19 thus can determine whether the other vehicle 52 is in the autonomous driving mode in accordance with the driving characteristics of the other vehicle 52. The autonomous driving determination unit 19 may also detect, as the driving characteristics of the other vehicle 52, any notification externally notifying that the other vehicle is in the autonomous driving mode, or detect any indication externally indicating the autonomous driving mode with any display or voice, such as "please go ahead", for notifying other vehicles (other people) of the intention.

The autonomous driving determination unit 19 acquires the behavior of the other vehicle as the driving characteristics of the other vehicle 52 so as to determine whether the other vehicle is in the autonomous driving mode in accordance with the behavior of the other vehicle 52. For example, the autonomous driving determination unit 19 can determine that the other vehicle 52 is in the autonomous driving mode when the other vehicle 52 shows the characteristics of action such as no pumping braking, a small change in acceleration in terms of time during deceleration, a constant distance or velocity, a small deviation or dispersion in the behavior of the other vehicle 52, high behavior stability, and mechanical behavior. The reason for this is that the autonomous driving mode can have characteristics capable of traveling control with less variation, showing a small or no jerk (time differential value of acceleration) as compared with the case of the manual driving mode. The autonomous driving determination unit 19 makes use of the driving characteristics of the other vehicle 52 which vary depending on either the manual driving mode (by person) or the autonomous driving mode.

The autonomous driving determination unit 19 may estimate the driving characteristics through the process described below and correct the action (intention) of the other vehicle 52 in accordance with the estimated driving characteristics, regardless of whether the other vehicle 52 is in the autonomous driving mode. The host vehicle 51 may be caused to temporarily stop at the safest timing with respect to all possible driving characteristics when the driving characteristics of the other vehicle 52 cannot be confirmed. The autonomous driving determination unit 19 may then estimate the driving characteristics of the other vehicle 52 in accordance with the behavior of the other vehicle 52 in response to the stopping action. The autonomous driving determination unit 19 can correct the timing of starting traveling and the course of the host vehicle 51 in accordance with the estimated driving characteristics.

The second action-probability correction unit 15 additionally predicts a primary course (latter movement) that the other vehicle 52 would take to decelerate or stop in front of the intersecting area 56 and enter the intersecting area 56 after the host vehicle 51 passes through the intersecting area 56, in accordance with the intention of action (latter movement) of yielding the way to the host vehicle 51 when the intersection determination unit 18 determines that the host vehicle 51 and the other vehicle 52 intersect with each other. At the same time, the second action-probability correction unit 15 additionally predicts a primary course (earlier movement) that the other vehicle 52 would take to enter the intersecting area 56 without deceleration in front of the intersecting area 56 in accordance with the intention of action (earlier movement) of passing through the intersecting area 56 prior to the host vehicle 51.

The second action-probability correction unit 15 then estimates a likelihood ratio of the respective probabilities of action predicted by the action probability prediction unit 12, the first action-probability correction unit 13, and the second action-probability correction unit 15 in accordance with the determination result of whether the other vehicle 52 is in the autonomous driving mode. In particular, in the traveling situation in which the connection is caused between the host vehicle 51 and the other vehicle 52, the second action-probability correction unit 15 estimates the likelihood ratio with respect to the alternatively-determined probabilities of action. For example, the second action-probability correction unit 15 estimates the likelihood ratio with respect to each of the probability of action (latter movement) and the probability of action (earlier movement) in accordance with the determination result of whether the other vehicle 52 is in the autonomous driving mode when the host vehicle 51 and the other vehicle 52 overlap with each other in the intersecting area 56. The second action-probability correction unit 15 estimates the likelihood ratio while taking account of an empirical rule or a statistical result demonstrating that the variation in the determination of action in the autonomous driving mode is typically smaller than that in the manual driving mode.

The second action-probability correction unit 15 also estimates the likelihood ratio with respect to the respective probabilities of action in accordance with the determination result of whether the other vehicle 52 is in the autonomous driving mode and the reaching time difference ΔT. In particular, the second action-probability correction unit 15 calculates the presumed time (reaching time) Ta that the host vehicle 51 needs to reach the intersecting area 56 in accordance with the position and the velocity of the host vehicle 51 on the map. The second action-probability correction unit 15 also calculates the presumed time (reaching time) Tb that the other vehicle 52 needs to reach the intersecting area 56 in accordance with the position and the behavior of the other vehicle on the map so as to calculate the reaching time difference ΔT (=Ta−Tb). The second action-probability correction unit 15 reads out the data indicated in the four graphs in FIG. 7B preliminarily stored in the microcomputer 100. The second action-probability correction unit 15 allots the determination result of whether the other vehicle 52 is in the autonomous driving mode and the reaching time difference ΔT to the data read out, so as to estimate the likelihood ratio of each of the probability of action (latter movement) and the probability of action (earlier movement).

For example, when the other vehicle 52 is in the manual driving mode and the reaching time difference ΔT is 5.5 seconds, the second action-probability correction unit 15 refers to the graph on the upper left side in FIG. 7B to estimate that the likelihood ratio (probability) with respect to the probability of action (earlier movement) of the other vehicle 52 is about 40%. When the other vehicle 52 is in the autonomous driving mode and the reaching time difference ΔT is 5.5 seconds, the second action-probability correction unit 15 refers to the graph on the lower left side in FIG. 7B to presume that the likelihood ratio (probability) with respect to the probability of action (earlier movement) of the other vehicle 52 is about 0%.

As described above, the second action-probability correction unit 15 takes account of the level of the variation in the determination of action which changes depending on whether the other vehicle 52 is in the autonomous driving mode, so as to estimate the likelihood ratio of the respective probabilities of action of the other vehicle 52 with high accuracy. The estimation of the probability of action (earlier movement) of the other vehicle 52 can execute the traveling assistance to the host vehicle 51, such as acceleration/deceleration control, preliminarily deceleration, steering control and lateral-position control, or notification or warning to the occupant of whether the other vehicle 52 moves first, so that the occupant can feel smooth traveling.

The course prediction unit 16 predicts a course (effective course) that the other vehicle 52 would follow, in accordance with the behavior detected by the behavior determination unit 11. In particular, the course prediction unit 16 calculates the effective course when the other vehicle 52 is presumed to take an action based on the intention of action predicted, by a conventional state estimation method such as Kalman filtering. As used herein, the term "effective course" encompasses profiles of positions of the other vehicle 52 at different times, and also profiles of velocities of the other vehicle 52 at the respective positions, as in the case of the primary course. The effective course and the primary course are common in that the other vehicle 52 would follow, but differ from each other in that the effective course is calculated in view of the behavior of the other vehicle 52, while the primary course is calculated without consideration of the behavior of the other vehicle 52.

Figure 8A:
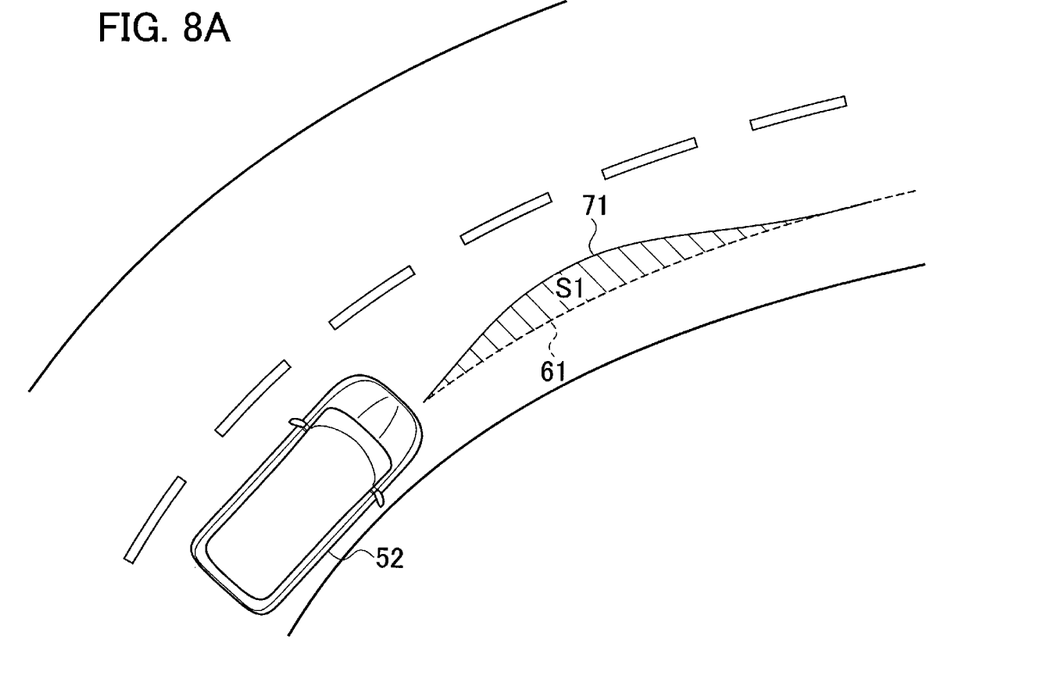
FIG. 8A is a zenith view illustrating a primary course (forward movement) 61 and an effective course (forward movement) 71 of the other vehicle 52 traveling on a two-lane curved road.
Figure 8B:
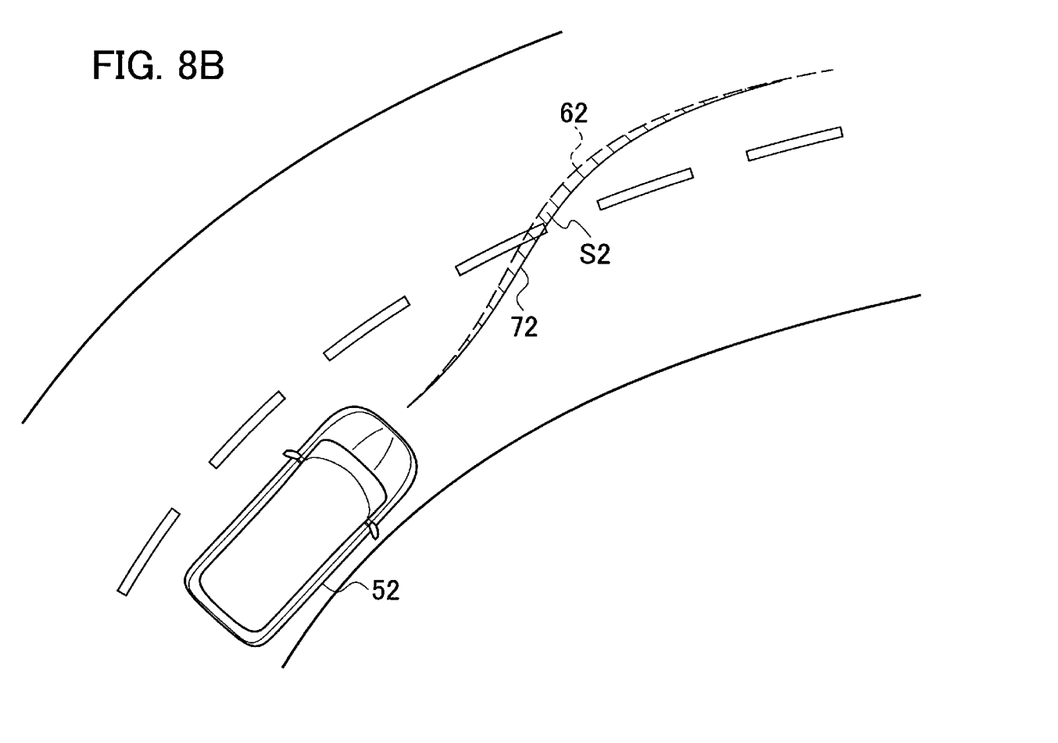
FIG. 8B is a zenith view illustrating a primary course (lane change) 62 and an effective course (lane change) 72 of the other vehicle 52 traveling on the two-lane curved road.

FIG. 8A and FIG. 8B illustrate primary courses (61 and 62) for the other vehicle 52 as examples calculated according to the intention of action and the road structure without the behavior of the other vehicle 52 taken into consideration. Since the current attitude (yaw angle) of the other vehicle 52 is not taken into consideration, for example, the respective primary courses (61 and 62) extend in different directions from the current position of the other vehicle 52. The course prediction unit 16 then takes account of the behavior of the other vehicle 52 to calculate the course (effective course) corresponding to the intention of action described above. Namely, the course prediction unit 16 calculates the effective course when the other vehicle 52 is presumed to take an action corresponding to the intention of action described above.

The attitude (yaw angle) of the other vehicle 52 illustrated in FIG. 8A and FIG. 8B inclines to the left from the primary course 61 of the other vehicle 52 following the traveling lane. The velocity of the other vehicle 52 only has a velocity component in the traveling direction, and the velocity component in the vehicle width direction is zero. The other vehicle 52 is thus in the state of making a forward movement. When the other vehicle 52 is traveling in accordance with the intention of action of following the traveling lane on the basis of the above attitude and velocity, the other vehicle 52 travels along an effective course 71 which starts leaving the primary course 61 toward the left and then returns to finally conform to the primary course 61, as shown in FIG. 8A. In other words, the other vehicle 52 is presumed to follow a corrected course (overshoot course) generated such that the deviation from the traveling lane is corrected. The course prediction unit 16 thus predicts the effective course 71 conforming to the intention of action of following the traveling lane (forward movement) on the basis of the attitude (yaw angle) and the velocity of the other vehicle 52.

When the other vehicle 52 is traveling in accordance with the intention of action of changing the lanes on the basis of the same attitude and velocity, the other vehicle 52 travels along an effective course 72 which starts turning in the left direction to be shifted to the left lane, and then makes a slight turn toward the right to correct the direction so as to follow the left lane, as illustrated in FIG. 8B. Namely, the effective course 72 generated includes a left-turn clothoid curve and a right-turn clothoid curve starting from a state in which the steering angle is in a neutral position. The effective course 72 is thus used for the lane change which takes substantially the same time as the "predetermined period of lane-change time" used for the calculation of the lane-change course 62. The curves used when the effective course is generated are not necessarily the clothoid curves, and may be any other curves. As shown in FIG. 8B, the effective course 72 has substantially the same configuration as the primary course 62 for changing the lanes.

The course prediction unit 16 calculates the course corresponding to the intention of action (effective course) while taking account of the behavior of the other vehicle 52 as to the respective probabilities of action predicted by the action probability prediction unit 12, the first action-probability correction unit 13, and the second action-probability correction unit 15, in the same manner as FIG. 8A and FIG. 8B. For example, in the traveling situation shown in FIG. 4, the course prediction unit 16 calculates the effective course (earlier movement) that the other vehicle 52 would take to pass through the intersecting area 56 prior to the host vehicle 51, and the effective course (latter movement) that the other vehicle 52 would take to pass through the intersecting area 56 after the host vehicle 51, on the basis of the position and the velocity of the other vehicle 52 on the map.

Although the above cases take account of the position, the attitude, and the velocity as examples of the behavior of the other vehicle 52, the respective effective courses may be calculated in view of the acceleration or the deceleration of the other vehicle 52 instead. For example, the deceleration upon the lane change can be presumed to be greater than the case of the forward movement.

The likelihood ratio estimation unit 17 compares each probability of action predicted by the action probability prediction unit 12, the first action-probability correction unit 13, and the second action-probability correction unit 15 with the behavior of the other vehicle 52 integrated by the detection integration unit 2a, so as to detect the action of the other vehicle 52. The likelihood ratio estimation unit 17 detects the action of the other vehicle 52 further in view of the likelihood ratio predicted by the second action-probability correction unit 15.

In particular, the likelihood ratio estimation unit 17 compares the primary course with the effective course for each of the probabilities of action predicted by the action probability prediction unit 12, the first action-probability correction unit 13, and the second action-probability correction unit 15. The likelihood ratio estimation unit 17 then calculates a likelihood ratio of the respective probabilities of action based on the difference between the primary course and the effective course. The likelihood ratio calculated is higher as the difference between the primary course and the effective course is smaller.

The likelihood ratio estimation unit 17 further weights the likelihood ratio of the respective probabilities of action depending on the likelihood ratio predicted by the second action-probability correction unit 15. For example, the likelihood ratio estimation unit 17 multiplies the likelihood ratio of the respective probabilities of action by the likelihood ratio predicted by the second action-probability correction unit 15 used as a coefficient. This calculation can integrate the likelihood ratio predicted by the second action-probability correction unit 15 with the likelihood ratio estimated by the likelihood ratio estimation unit 17. For example, when the other vehicle 52 is in the autonomous driving mode and the reaching time difference $\Delta T$ is less than 5.5 seconds, the likelihood ratio estimation unit 17 multiplies the likelihood ratio of the probability of action (latter movement) by a greater coefficient than the likelihood ratio of the probability of action (earlier movement).

The probability of action with the highest likelihood ratio can be determined to be the most reasonable when the determination result of whether the other vehicle 52 is in the autonomous driving mode is taken into consideration. The likelihood ratio estimation unit 17 then determines that the probability of action estimated to have the highest likelihood ratio is the action that the other vehicle 52 takes. The difference between the primary course and the effective course is computed according to the sum of differences between the profiles of the positions or the velocities of the respective courses, for example. FIG. 8A and FIG. 8B illustrate the areas S1 and S2, each being a sum obtained by the integration of positional differences between the primary course and the effective course. The positional differences can be determined to be smaller as the area is smaller, so that a higher likelihood ratio is obtained. As another example, when the positional differences are small but the profiles of the velocities greatly differ, a smaller likelihood ratio is obtained. The likelihood ratio is an example of an index indicating the possibility that the probability of action results in being true, and any other indication may be used instead of the likelihood ratio.

The likelihood ratio estimation unit 17 also compares the primary course with the effective course for each of the probabilities of action predicted by the action probability prediction unit 12, the first action-probability correction unit 13, and the second action-probability correction unit 15 to calculate the likelihood ratio, and multiplies the calculated likelihood ratio by the coefficient (the likelihood ratio predicted by the second action-probability correction unit 15). The likelihood ratio estimation unit 17 then determines that the probability of action estimated to have the highest likelihood ratio is the action that the other vehicle 52 takes.

As described above, the action prediction unit 10 detects the action of the other vehicle 52 in accordance with the likelihood ratio of the respective probabilities of action estimated by the likelihood ratio estimation unit 17. The term "action of the other vehicle" encompasses the profiles of the course and the velocity of the other vehicle. The course of the other vehicle 52 refers to the profiles of the positions of the other vehicle 52 at different times.

The host-vehicle route generation unit 21 generates a route of the host vehicle 51 based on the action of the other vehicle 52 detected by the action prediction unit 10. For example, in the traveling situation shown in FIG. 4, when the action prediction unit 10 detects the action of the earlier movement of the other vehicle 52, the host-vehicle route generation unit 21 generates the route that the host vehicle 51 follows to decelerate or stop in front of the intersecting area 56 and then enter the intersecting area 56 after the passage of the other vehicle 52. The host-vehicle route generation unit 21 thus can generate the route that the host vehicle 51 can follow smoothly while avoiding a collision with the other vehicle 52 and avoiding sudden deceleration or quick steering required in response to the behavior of the other vehicle 52. When the action prediction unit 10 detects the action of the latter movement of the other vehicle 52, the host-vehicle route generation unit 21 generates the route that the host vehicle 51 follows to enter the intersecting area 56 prior to the other vehicle 52 without deceleration or stop in front of the intersecting area 56. This route generation can avoid a deadlock to prevent a hindrance to a traffic flow. The term "route of the host vehicle 51" encompasses profiles of positions of the host vehicle 51 at different times, and also profiles of velocities of the host vehicle 51 at the respective positions.

This embodiment detects the action of the other vehicle 52 including the course of the other vehicle 52 according to the behavior of the other vehicle 52 on the map. The route generation for the host vehicle 51 based on the course of the other vehicle 52 thus corresponds to the route generation based on a change in relative distance to the other vehicle 52, acceleration or deceleration, or a difference in attitude angle.

For example, in the traveling situation shown in FIG. 4, when the other vehicle 52 stays in the traveling lane and starts decelerating, the behavior of the other vehicle 52 can be presumed to indicate that the other vehicle 52 is willing to yield the way to the host vehicle 51 to let the host vehicle 51 move ahead. In this case, generating the route of the host vehicle 51 or executing the traveling assistance to the host vehicle 51 in view of the intention of action of the other vehicle 52, enables the host vehicle 51 to keep going without deceleration or to accelerate so as to pass through the intersecting area 56 first. This control can avoid the situation in which the host vehicle 51 and the other vehicle 52 yield the way to each other, so as to facilitate the flow of traffic accordingly.

The vehicle control unit 22 drives at least one of a steering actuator, an acceleration pedal actuator, and a brake pedal actuator in accordance with its position calculated by the position-in-map calculation unit 5 so that the host vehicle 51 travels to follow the route generated by the host-vehicle route generation unit 21. The vehicle control unit 22 also drives a display or a speaker in the vehicle to make a display, or notification or warning to the occupant. While the embodiment is illustrated with the case in which the traveling assistance to the host vehicle 51 is executed in accordance with the generated route, the traveling assistance to the host vehicle 51 may be executed regardless of the generation of the route of the host vehicle 51. In such a case, the traveling assistance can be executed according to the relative distance to the other vehicle 52 or a difference in the attitude angle between the other vehicle 52 and the host vehicle 51.

Figure 1:
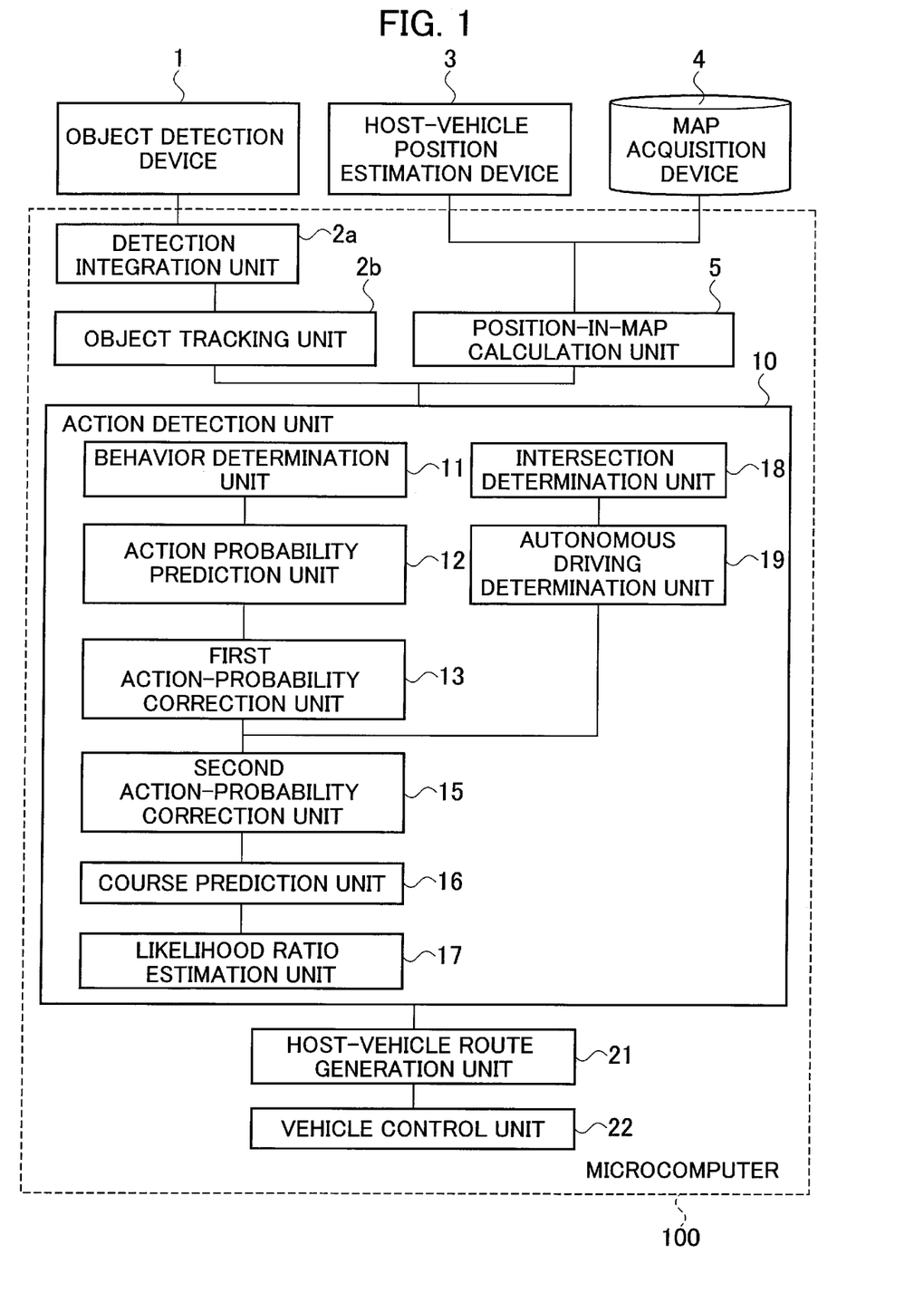
FIG. 1 is a block diagram showing a configuration of a traveling assistance device and an action detection device according to an embodiment.

A traveling assistance method using the traveling assistance device shown in FIG. 1 is described below with reference to FIG. 2 and FIG. 3. The microcomputer 100 shown in FIG. 1 may be used to function as an action detection device for detecting the action of the other vehicle 52, so as to implement the action detection method of finally outputting a result of a processing operation shown in step S06 in FIG. 2.

First, in step S01, the object detection device 1 detects behavior of objects around the host vehicle 51 by the respective object detection sensors. The process proceeds to step S02, and the detection integration unit 2a integrates a plurality of detection results obtained by the plural object detection sensors, and outputs a single detection result per object. The object tracking unit 2b tracks each object detected and integrated.

The process proceeds to step S03, and the host-vehicle position estimation device 3 measures the position, the attitude, and the velocity of the host vehicle 51 on the basis of a predetermined reference point by use of the position detection sensor. The process proceeds to step S04, and the map acquisition device 4 acquires the map information indicating the structure of the road on which the host vehicle 51 is traveling.

The process proceeds to step S05, and the position-in-map calculation unit 5 estimates the position and the attitude of the host vehicle 51 on the map according to the position of the host vehicle 51 measured in step S03 and the map data acquired in the step S04. The process proceeds to step S06, and the action prediction unit 10 predicts the action of the other vehicle 52 around the host vehicle 51 in accordance with the detection result (the behavior of the other vehicle 52) obtained in step S02 and the position of the host vehicle 51 specified in step S05.

The process in step S06 is described in more detail below with reference to FIG. 3. In step S611, the behavior determination unit 11 determines the road on which the other vehicle 52 is traveling and its traveling lane on the road according to the position of the host vehicle 51 on the map, and the behavior of the object acquired in step S02. The process proceeds to step S612, and the action probability prediction unit 12 predicts the probability of action of the other vehicle 52 based on the map. For example, the action probability prediction unit 12 predicts the intention of action according to the road structure.

The process proceeds to step S613, and the microcomputer 100 executes the process in steps S611 and S612 for all of the other vehicles 52 detected in step S01. After the process is executed (YES in step S613), the process proceeds to step S614, and the first action-probability correction unit 13 takes account of a stationary object simultaneously detected in step S01 to correct the probability of action predicted in step S612. For example, as shown in FIG. 4, the first action-probability correction unit 13 adds the intention of action and the primary course that the other vehicle 52 would take to temporarily change the course toward the right so as to avoid the parked vehicle 53 and keep the traveling direction.

The process proceeds to step S615, and when another moving object is detected in step S01 simultaneously with the other vehicle 52, the first action-probability correction unit 13 takes account of the other moving object to correct the probability of action predicted in step S612.

The process proceeds to step S616, and the intersection determination unit 18 determines whether the traveling region of the host vehicle 51 and the traveling region of the other vehicle 52 intersect with each other. The process proceeds to step S618 when the respective traveling regions intersect with each other (YES in step S617), and the process proceeds to step S620 when the respective traveling regions do not intersect with each other (NO in step S617).

In step S618, the intersection determination unit 18 calculates the reaching time difference ΔT between the host vehicle 51 and the other vehicle 52 traveling to the intersecting area 56. The autonomous driving determination unit 19 acquires the driving characteristics of the other vehicle 52 to determine whether the other vehicle 52 is in the autonomous driving mode in accordance with the acquired driving characteristics. The second action-probability correction unit 15 estimates the likelihood ratio of the respective probabilities of action of the other vehicle 52 in accordance with the determination result of whether the other vehicle 52 is in the autonomous driving mode and the reaching time difference ΔT. In particular, the second action-probability correction unit 15 allots the determination result of whether the other vehicle 52 is in the autonomous driving mode and the reaching time difference ΔT to the data shown in the four graphs in FIG. 7B, so as to estimate the likelihood ratio of the respective probabilities of action in the traveling situation in which the connection is caused between the host vehicle 51 and the other vehicle 52. The process then proceeds to step S620.

In step S620, the microcomputer 100 executes the process from steps S614 to S618 for all of the other vehicles detected in step S01. After the process is executed (YES in step S620), the process proceeds to step S621, and the course prediction unit 16 calculates the effective course (71 and 72, refer to FIG. 8A and FIG. 8B) of the other vehicle 52 when the other vehicle 52 keeps its behavior and is presumed to take an action based on the intention of action predicted, by a conventional state estimation method such as Kalman filtering.

The process proceeds to step S622, and the likelihood ratio estimation unit 17 compares the primary course with the effective course for each of the probabilities of action predicted in steps S612, S614, and S615. The likelihood ratio estimation unit 17 then calculates a likelihood ratio of the respective probabilities of action based on the difference between the primary course and the effective course. The likelihood ratio estimation unit 17 further weights the likelihood ratio of the respective probabilities of action in accordance with the likelihood ratio estimated in step S618. The likelihood ratio estimation unit 17 determines that the probability of action estimated to have the highest likelihood ratio is the action that the other vehicle 52 takes.

The process proceeds to step S621, and the microcomputer 100 executes the process in steps S623 and S622 for all of the other vehicles detected in step S01. The specific process in step S06 shown in FIG. 2 thus ends.

Figure 2:
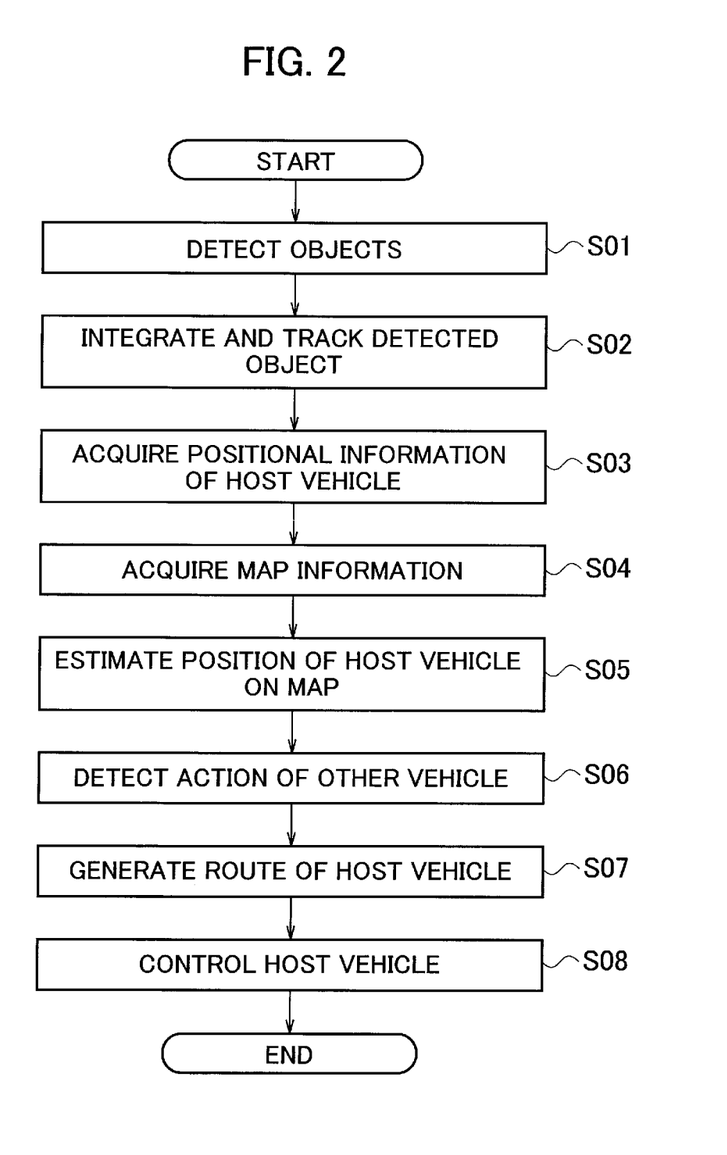
FIG. 2 is a flowchart showing an example of an operation of the traveling assistance device and the action detection device shown in FIG. 1.
Figure 3:
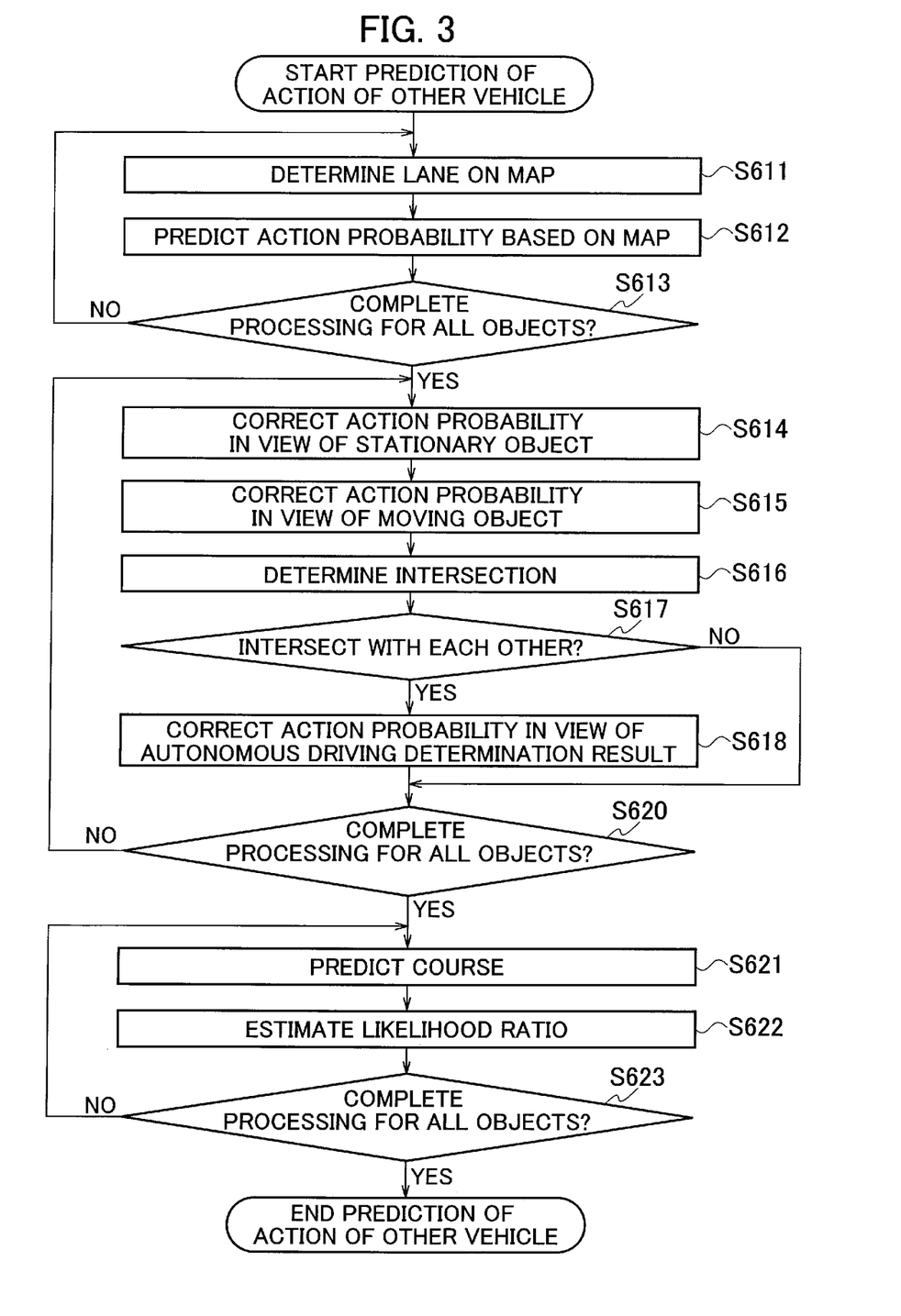
FIG. 3 is a flowchart showing a specific process in step S06 shown in FIG. 2.

The process proceeds to step S07 shown in FIG. 2, and the host-vehicle route generation unit 21 generates a route of the host vehicle 51 based on the actions of the other vehicles predicted in step S06. The process proceeds to step S08, and the vehicle control unit 22 executes the traveling assistance to the host vehicle 51 so as to lead the host vehicle 51 to travel to follow the route generated in step S07.

Figure 5:
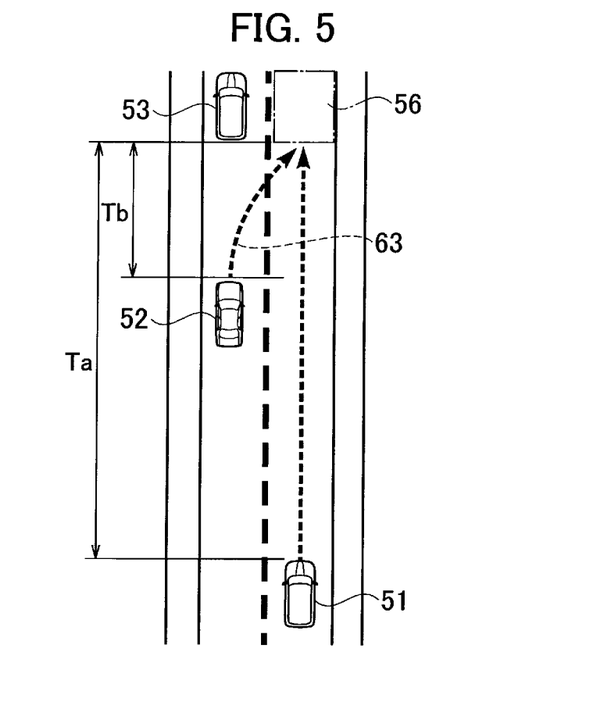
FIG. 5 is a zenith view illustrating a traveling situation in which the host vehicle 51 is traveling in the right lane on a two-lane, one-way road, and the other vehicle 52 is traveling in the left lane obliquely ahead of the host vehicle 51.
Figure 6:
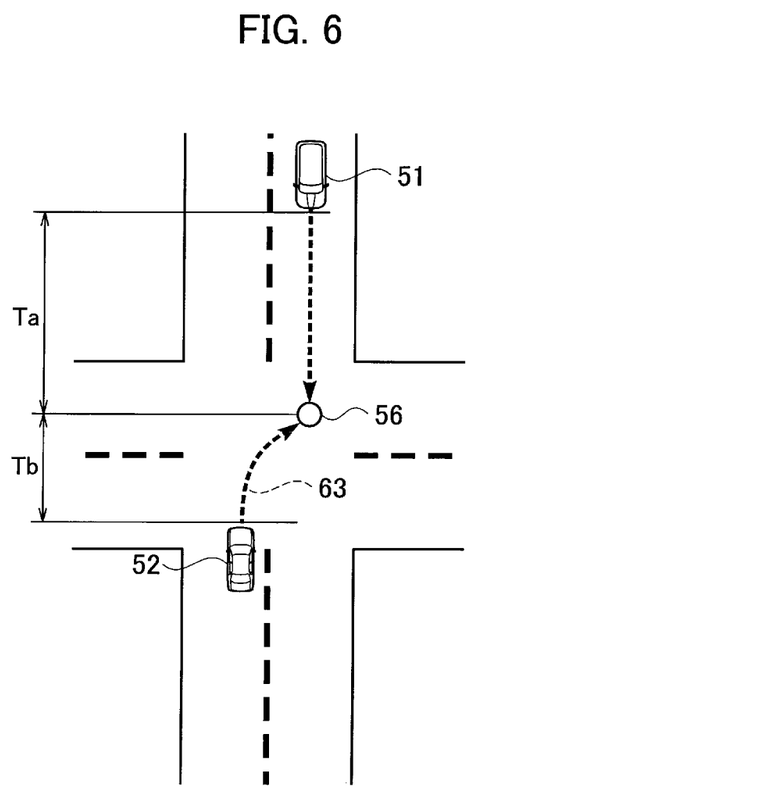
FIG. 6 is a zenith view illustrating a traveling situation in which the host vehicle 51 in its traveling lane and the other vehicle 52 in the oncoming lane are traveling toward the same intersection.

The present embodiment is effective not only in the traveling situation shown in FIG. 4 but also in other traveling situations. FIG. 5 and FIG. 6 each illustrate an example of the other traveling situations in which the host vehicle 51 has higher priority on the road over the other vehicle 52, but the other vehicle 52 would move ahead prior to the host vehicle 51 in view of the timing.

FIG. 5 illustrates a traveling situation in which the host vehicle 51 is traveling in the right lane on a two-lane, one-way road, and the other vehicle 52 is traveling on the left lane obliquely ahead of the host vehicle 51. The parked vehicle 53 is present in the left lane ahead of the other vehicle 52. The other vehicle 52 temporarily changes the course toward the right so as to avoid the parked vehicle 53 and keep the traveling direction, as in the case of the traveling situation shown in FIG. 4. Since the traveling region of the host vehicle 51 and the traveling region of the other vehicle 52 intersect with each other in the intersecting area 56, the host vehicle 51 and the other vehicle 52 cannot simultaneously enter the intersecting area 56, and either the host vehicle 51 or the other vehicle 52 needs to change the timing of entering the intersecting area 56. The host vehicle 51 has higher priority on the road over the other vehicle 52, and the reaching time Ta of the host vehicle 51 is longer than the reaching time Tb of the other vehicle 52.

FIG. 6 illustrates a traveling situation in which the host vehicle 51 in its traveling lane and the other vehicle 52 in the oncoming lane both are traveling toward the same intersection. The host vehicle 51 is to pass straight through the intersection, while the other vehicle 52 is turning to the right at the intersection. The host vehicle 51 and the other vehicle 52 thus intersect with each other at the intersecting area 56 in the intersection. The host vehicle 51 has higher priority on the road over the other vehicle 52, and the reaching time Ta of the host vehicle is longer than the reaching time Tb of the other vehicle 52.

In the respective traveling situations shown in FIG. 5 and FIG. 6, a connection is caused between the host vehicle 51 and the other vehicle 52 as to which one of the host vehicle 51 and the other vehicle 52 should enter the intersecting area 56 first.

According to the embodiment, the data shown in the respective graphs in FIG. 7B is referred to, based on the determination result of whether the other vehicle 52 is in the autonomous driving mode and the reaching time difference ΔT, so as to accurately determine the probability of entrance of the other vehicle 52. The accurate determination can ensure the safe traveling of both the host vehicle 51 and the other vehicle 52, and also prevent a deadlock.

As described above, the embodiment can achieve the following effects.

The microcomputer 100 (an example of a controller) acquires the driving characteristics of the other vehicle 52 to determine whether the other vehicle 52 is in the autonomous driving mode in accordance with the driving characteristics, and executes the traveling assistance to the host vehicle 51 based on the determination result of whether the other vehicle 52 is in the autonomous driving mode. The action of the other vehicle 52 would vary depending on whether the other vehicle 52 is in the autonomous driving mode. The microcomputer 100 thus ascertains whether the other vehicle 52 is in the autonomous driving mode, so as to execute the traveling assistance to the host vehicle 51 in accordance with the determination result of whether to be in the autonomous driving mode. The ascertainment of the autonomous driving mode can accurately estimate the action of the other vehicle 52, so as to allow the host vehicle 51 to travel safely with less waiting time. A possibility that a deadlock is caused can also be reduced.

The microcomputer 100 detects the action of the other vehicle 52 in accordance with the determination result of whether the other vehicle 52 is in the autonomous driving mode and the reaching time difference ΔT. When the respective traveling regions of the host vehicle 51 and the other vehicle 52 intersect with each other in the intersecting area 56, the host vehicle 51 and the other vehicle 52 cannot simultaneously enter the intersecting area 56, and either the host vehicle 51 or the other vehicle 52 needs to yield the way to the other to let it pass through first. In this traveling situation, the variation in the determination of action of the other vehicle 52 in the autonomous driving mode with respect to the reaching time difference ΔT is smaller than the case in which the other vehicle 52 is not in the autonomous driving mode. The microcomputer 100 thus can accurately detect the action of the other vehicle 52 in accordance with the determination result of whether the other vehicle 52 is in the autonomous driving mode and the reaching time difference ΔT.

The microcomputer 100 detects the probability that the other vehicle 52 will enter the intersecting area 56 prior to the host vehicle 51 in accordance with the determination result of whether the other vehicle 52 is in the autonomous driving mode and the reaching time difference ΔT, and executes the traveling assistance to the host vehicle 51 in accordance with the detected probability. The variation in the determination of action of the other vehicle 52 in the autonomous driving mode with respect to the reaching time difference ΔT is smaller than the case in which the other vehicle 52 is not in the autonomous driving mode. The microcomputer 100 thus can accurately detect the probability that the other vehicle 52 will enter the intersecting area 56 prior to the host vehicle 51.

The embodiment exemplifies the case in which the other vehicle 52 has lower priority on the road over the host vehicle 51, and the reaching time Tb of the other vehicle 52 is shorter than the reaching time Ta of the host vehicle 51. The microcomputer 100 can accurately detect the action of the other vehicle 52 in the traveling situation in which the host vehicle 51 needs to let the other vehicle 52 go first in view of the timing, even though the host vehicle 51 has higher priority on the road over the other vehicle 52.

The microcomputer 100 executes the traveling assistance to the host vehicle 51 such that the timing at which the host vehicle 51 passes through the intersecting area 56 is earlier in the case in which the other vehicle 52 is in the autonomous driving mode than in the case in which the other vehicle 52 is not in the autonomous driving mode. The microcomputer 100 can accurately detect the action of the other vehicle 52 in accordance with the determination result of whether the other vehicle 52 is in the autonomous driving mode and the reaching time difference ΔT, so as to reduce a possibility of a deadlock.

While the present invention has been described above by reference to the embodiment, it should be understood that the present invention is not intended to be limited to the above descriptions, and various alternatives and modifications will be apparent to those skilled in the art.

While the above embodiment has been illustrated with the case in which the host vehicle 51 is in an autonomous driving mode capable of autonomous traveling, the host vehicle 51 may be in a manual driving mode operated by the driver of the host vehicle 51. In such a case, the microcomputer 100 may control, for the operation of the host vehicle 51 (for driving support), a speaker, a display, and a user interface thereof for guiding the driver in operating the steering wheel, the accelerator, and the brake by use of voice or images.

The above embodiment has been illustrated with the case with reference to FIG. 6 in which the host vehicle 51 is traveling in the right lane while the other vehicle 52 is traveling in the left lane, but may also be applied to a traveling situation in which the host vehicle 51 is traveling in the left lane while the other vehicle 52 is traveling in the right lane, and the host vehicle 51 is turning to the right. When the reaching time difference ΔT is 4 seconds (when the passage of the other vehicle 52 is later by 4 seconds than the passage of the host vehicle 51), for example, the way of the traveling assistance to the host vehicle 51 can differ depending on whether the other vehicle 52 is in the autonomous driving mode. In particular, when the other vehicle 52 is in the manual driving mode, the occupant of the other vehicle 52 could yield the way to the host vehicle 51 even through the other vehicle 52 has higher priority on the road in which the other vehicle 52 ordinarily passes through the intersection first. In contrast, the other vehicle 52 in the autonomous driving mode travels in accordance with a predetermined threshold of the reaching time difference ΔT, and the possibility that the other vehicle 52 passes through the intersection prior to the host vehicle 51 is high when the reaching time difference ΔT is smaller than the threshold. The way of traveling thus can vary depending on whether the other vehicle 52 is in the autonomous driving mode in the traveling situation in which the host vehicle 51 is traveling in the left lane while the other vehicle 52 is traveling in the right lane, and the host vehicle 51 is turning to the right. According to the embodiment, the action of the other vehicle 52 is detected in accordance with the determination of whether the other vehicle 52 is in the autonomous driving mode, so as to execute the traveling assistance to the host vehicle 51 based on the detection result. The traveling assistance in this situation enables the host vehicle 51 to travel smoothly by releasing a braking state to prepare to start when the other vehicle 52 is in the manual driving mode, or by making a stop when the other vehicle 52 is in the autonomous driving mode, for example.

The traveling assistance according to the embodiment is not limited to the case of regulating the course of the host vehicle 51, but may also be applied to a case of executing the autonomous driving control or the traveling assistance control (including autonomous braking) based on the prediction results, including the operation of accelerating and decelerating, preliminarily decelerating, controlling a position within a lane, moving to an edge of a road, and considering the order of passage of lanes, for example. The above control enables the host vehicle 51 to travel smoothly, so as to prevent the occupant from feeling uncomfortable.

REFERENCE SIGNS LIST

51 HOST VEHICLE
52 OTHER VEHICLE
53 PARKED VEHICLE
56 INTERSECTING AREA
100 MICROCOMPUTER (CONTROLLER)
Ta REACHING TIME OF HOST VEHICLE
Tb REACHING TIME OF OTHER VEHICLE

The invention claimed is:

1. A traveling assistance method of a traveling assistance device for detecting an action of another vehicle around a host vehicle to execute traveling assistance to the host vehicle based on the detected action of the other vehicle, the method comprising:

acquiring a driving characteristic of the other vehicle;
determining whether the other vehicle is in an autonomous driving mode depending on the driving characteristic;
setting an intersecting area in which a traveling region of the host vehicle and a traveling region of the other vehicle intersect with each other;
determining the probability that the other vehicle will enter the intersecting area prior to the host vehicle in accordance with a result of determination of whether the other vehicle is in the autonomous driving mode; and
executing the traveling assistance to control travel of the host vehicle.

2. The traveling assistance method of the traveling assistance device according to claim 1, further comprising:

calculating a difference in reaching time between the host vehicle and the other vehicle traveling toward the intersecting area in which the traveling region of the host vehicle and the traveling region of the other vehicle intersect with each other; and
determining the probability in accordance with both the result of the determination of whether the other vehicle is in the autonomous driving mode and the reaching time difference.

3. The traveling assistance method of the traveling assistance device according to claim 2, wherein determining the probability that the other vehicle enters the intersecting area prior to the host vehicle is further performed in accordance with the reaching time difference so as to predict the action of the other vehicle in accordance with the probability.

4. The traveling assistance method of the traveling assistance device according to claim 2, wherein a course that the other vehicle is following has lower priority over a course that the host vehicle is following, and the reaching time is shorter for the other vehicle than for the host vehicle.

5. The traveling assistance method of the traveling assistance device according to claim 2, wherein executing the traveling assistance is performed such that a timing at which the host vehicle passes through the intersecting area is earlier when the other vehicle is in the autonomous driving mode than when not being in the autonomous driving mode.

6. The traveling assistance method of the traveling assistance device according to claim 1, wherein the traveling assistance comprises executing acceleration and deceleration control for the host vehicle.

7. The traveling assistance method of the traveling assistance device according to claim 1, wherein the traveling assistance comprises executing steering control for the host vehicle.

8. The traveling assistance method of the traveling assistance device according to claim 1, wherein the traveling assistance of the host vehicle comprises stopping the host vehicle or releasing a braking state of the host vehicle.

9. A traveling assistance device for detecting an action of another vehicle around a host vehicle to execute traveling assistance to the host vehicle based on the detected action of the other vehicle, the device comprising:

a sensor configured to acquire a driving characteristic of the other vehicle; and
a controller configured to:
determine whether the other vehicle is in an autonomous driving mode depending on the driving characteristic;
set an intersecting area in which a traveling region of the host vehicle and a traveling region of the other vehicle intersect with each other;
determine the probability that the other vehicle will enter the intersecting area prior to the host vehicle in accordance with a result of determination of whether the other vehicle is in the autonomous driving mode; and
execute the traveling assistance to control travel of the host vehicle.

* * * * *